(12) United States Patent
Li et al.

(10) Patent No.: US 10,417,436 B2
(45) Date of Patent: Sep. 17, 2019

(54) TPM 2.0 PLATFORM HIERARCHY AUTHENTICATION AFTER UEFI POST

(71) Applicant: LENOVO Enterprise Solutions (Singapore) PTE. LTD., New Tech Park (SG)

(72) Inventors: Tian He Li, Shanghai (CN); Tang Wen Wei, Shanghai (CN)

(73) Assignee: LENOVO Enterprise Solutions (Singapore) PTE. LTD., Singapore (SG)

( * ) Notice: Subject to any disclaimer, the term of this patent is extended or adjusted under 35 U.S.C. 154(b) by 133 days.

(21) Appl. No.: 15/480,032

(22) Filed: Apr. 5, 2017

(65) Prior Publication Data

US 2017/0286705 A1    Oct. 5, 2017

(30) Foreign Application Priority Data

Apr. 5, 2016    (CN) .......................... 2016 1 0204923

(51) Int. Cl.
| | |
|---|---|
| *H04L 29/06* | (2006.01) |
| *G06F 21/62* | (2013.01) |
| *G06F 21/45* | (2013.01) |
| *H04L 9/32* | (2006.01) |

(52) U.S. Cl.
CPC .......... *G06F 21/6209* (2013.01); *G06F 21/45* (2013.01); *H04L 9/3247* (2013.01); *H04L 63/0428* (2013.01); *H04L 63/06* (2013.01); *H04L 63/10* (2013.01); *H04L 2209/127* (2013.01)

(58) Field of Classification Search
CPC ... G06F 21/6209; G06F 21/45; H04L 9/3247; H04L 63/10; H04L 63/0428; H04L 63/06; H04L 2209/127

See application file for complete search history.

(56) References Cited

U.S. PATENT DOCUMENTS

| | | | |
|---|---|---|---|
| 8,608,057 B1 * | 12/2013 | Crews ..................... | G06F 21/57 235/379 |
| 2005/0166051 A1 * | 7/2005 | Buer ..................... | H04L 9/3263 713/173 |
| 2008/0130893 A1 * | 6/2008 | Ibrahim ................ | G06F 21/572 380/277 |

(Continued)

*Primary Examiner* — Mohammad A Siddiqi
(74) *Attorney, Agent, or Firm* — Kunzler Bean & Adamson; Bruce R. Needham

(57) ABSTRACT

A method of accessing a trusted platform module in a computing device is disclosed. The method includes storing a platform authorization key in a memory of the computing device that includes the trusted platform module. The platform authorization key includes permitting access to the trusted platform module. The method includes obtaining a digital signature in response to the computing device requesting access to the trusted platform module. The digital signature is generated using at least a command for configuring the trusted platform module. The method includes verifying the digital signature and allowing retrieval of the platform authorization key from the memory of the computing device in order to access the trusted platform module in response to the digital signature is verified, and denying retrieval of the platform authorization key otherwise.

20 Claims, 4 Drawing Sheets

(56) References Cited

U.S. PATENT DOCUMENTS

| | | | | |
|---|---|---|---|---|
| 2009/0041252 A1* | 2/2009 | Hanna | H04L 63/08 | |
| | | | 380/278 | |
| 2010/0263023 A1* | 10/2010 | Xiao | H04L 41/0893 | |
| | | | 726/3 | |
| 2011/0087872 A1* | 4/2011 | Shah | H04L 9/3236 | |
| | | | 713/2 | |
| 2011/0191579 A1* | 8/2011 | Xiao | H04L 41/0893 | |
| | | | 713/156 | |
| 2011/0239271 A1* | 9/2011 | Xiao | G06F 21/31 | |
| | | | 726/1 | |
| 2013/0333015 A1* | 12/2013 | Reynolds | H04L 63/0861 | |
| | | | 726/7 | |
| 2015/0379306 A1* | 12/2015 | Zimmer | G06F 21/72 | |
| | | | 713/193 | |
| 2016/0048694 A1* | 2/2016 | Martinez | G06F 21/606 | |
| | | | 713/193 | |

* cited by examiner

TPM 2.0 PLATFORM HIERARCHY AUTHENTICATION AFTER UEFI POST

CROSS-REFERENCE TO RELATED APPLICATIONS

This patent application claims priority to Chinese Patent Application No. 2016/10204923.8 filed on Apr. 5, 2016 for Tian He Li, et al., the entire contents of which are incorporated herein by reference for all purposes.

FIELD

The present disclosure relates to methods and systems for accessing a trusted platform module ("TPM") of a computing device, for example, methods and systems for carrying out TPM platform hierarchy authentication.

BACKGROUND

A TPM is a secure cryptoprocessor which is dedicated to secure hardware by integrating cryptographic keys into devices. A TPM 2.0 module has three hierarchies, namely, platform hierarchy, storage hierarchy and endorsement hierarchy. Each of the hierarchies is controlled by a corresponding control domain via an authorization value. For example, the platform hierarchy is controlled by a platform firmware control domain and its access requires an authorization key in form of a platformAuth value. The authorization value needs to be handled carefully since its disclosure or exposure may lead to serious security breaches.

Upon system reset or boot-up, the TPM is accessible by the system firmware interface and the value of platformAuth is empty. Conventionally, to prevent any unauthorized access afterwards, the system firmware sets platformAuth value to a random number to lock the access to the platform firmware control domain. The platformAuth value is subsequently cleared from the memory so that the platform hierarchy becomes inaccessible after Unified Extensible Firmware Interface ("UEFI") POST.

However, the above process makes it tedious to reconfigure the TPM. For example, whenever a change needs to be made to the TPM of a computer system, such as a change in the security setting of the TPM, it is necessary to reboot the computer system to make the change. This is laborious and time-consuming, and especially when changes need to be made to multiple computer systems. Note that this problem is intrinsic to the field of computer systems.

Therefore, it would be desirable to have improved methods and systems for performing platform firmware control domain authentication.

BRIEF SUMMARY

In general terms, the present disclosure proposes storing a platform authorization key in a memory of the computing device and using a digital signature to verify authenticity of the TPM commands before allowing access to the memory to retrieve the platform authorization key. Note that the present disclosure solves a problem that intrinsically arises from and exists in the field of computers.

According to a first aspect, there is provided a method of accessing a trusted platform module in a computing device. The method includes storing a platform authorization key in a memory of the computing device that includes the trusted platform module. The platform authorization key permitting access to the trusted platform module. The method includes obtaining a digital signature in response to the computing device requesting access to the trusted platform module. The digital signature is generated using at least a command for configuring the trusted platform module. The method includes verifying the digital signature, and allowing retrieval of the platform authorization key from the memory of the computing device in order to access the trusted platform module in response to the digital signature is verified, and denying retrieval of the platform authorization key otherwise.

According to a second aspect, there is provided a method of authenticating a command for configuring a trusted platform module in a computing device. The method includes a software application installed on the operating system of the computing device performing operations of generating a request for configuring the trusted platform module, obtaining a digital signature, where the digital signature is generated using the command, and causing the digital signature to be verified thereby authenticating the command for execution by the trusted platform module upon successful verification.

According to a third aspect, there is provided a computing device that includes a trusted platform module, a processor, a memory component configured to store a platform authorization key for permitting access to the trusted platform module, and a data storage device. The data storage device stores non-transitory instructions operative by the processor to anyone of the methods described above.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
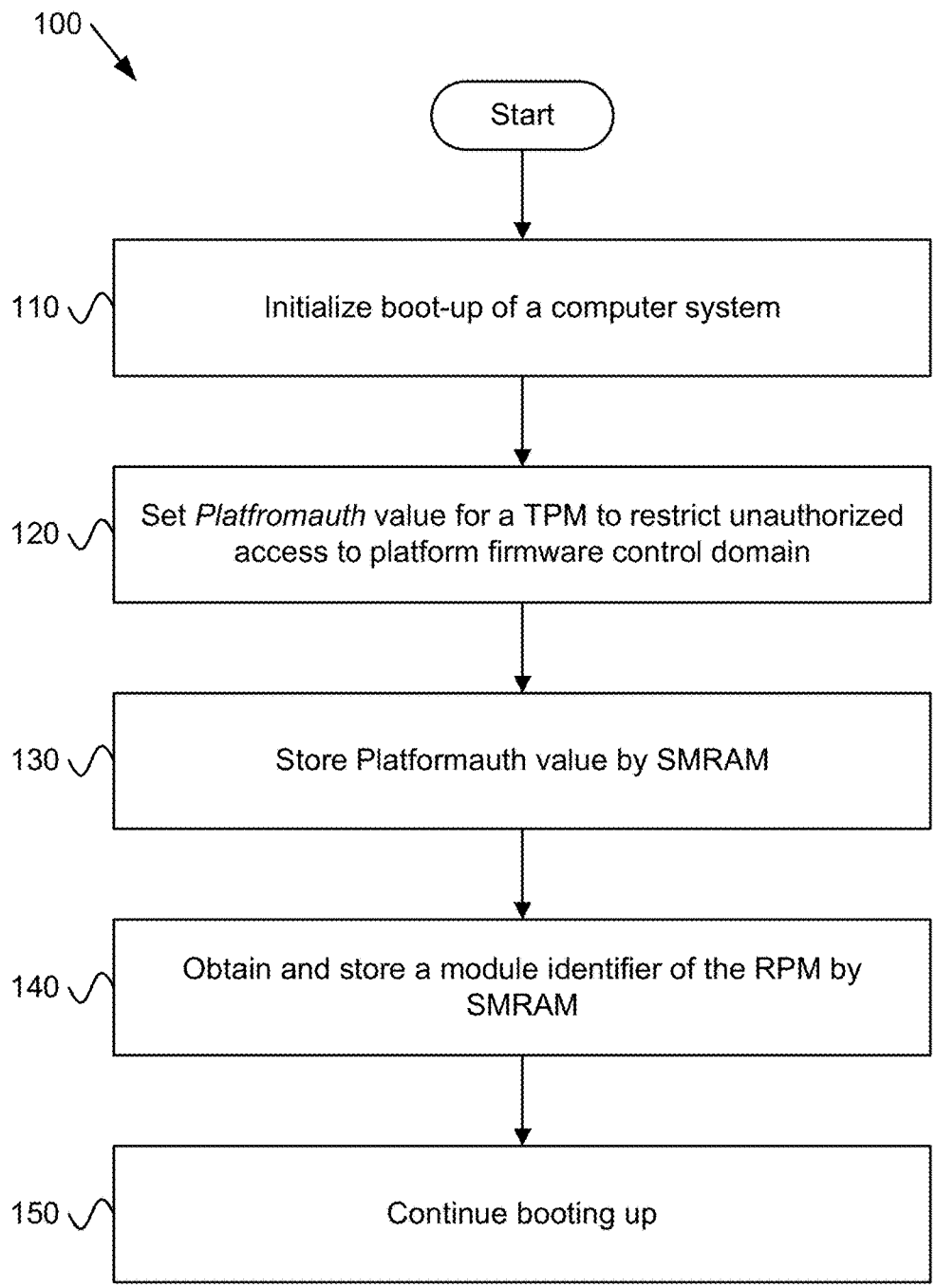
FIG. 1 is a flow diagram of a method according to an embodiment.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or "Flash memory"), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

In general terms, the present disclosure proposes storing a platform authorization key in a memory of the computing device and using a digital signature to verify authenticity of the TPM commands before allowing access to the memory to retrieve the platform authorization key. Note that the present disclosure solves a problem that intrinsically arises from and exists in the field of computers.

According to a first aspect, there is provided a method of accessing a trusted platform module in a computing device. The method includes storing a platform authorization key in a memory of the computing device that includes the trusted platform module. The platform authorization key permitting access to the trusted platform module. The method includes obtaining a digital signature in response to the computing device requesting access to the trusted platform module. The digital signature is generated using at least a command for configuring the trusted platform module. The method includes verifying the digital signature, and allowing retrieval of the platform authorization key from the memory of the computing device in order to access the trusted platform module in response to the digital signature is verified, and denying retrieval of the platform authorization key otherwise.

In one embodiment, the platform authorization key is stored in a secure memory of the computing device. For example, the secure memory is a system management memory component that is accessible by a processor of the computing device running under a system management mode. In another embodiment, obtaining a digital signature in response to the computing device requesting access to the trusted platform module may include generating a command data package encoding a module identifier of the trusted platform module and the command, and transmitting the command data package to a sign server to obtain the digital signature.

In one embodiment, the module identifier is stored in the memory and the method includes an operation of retrieving the module identifier so as to generate the command data package. In another embodiment, the method further includes verifying the module identifier and the platform authorization key may be retrieved further upon successful verification of the module identifier. In another embodiment, the memory may store a cryptographic key and the digital signature is verified by signing the command data package using the cryptographic key.

In one embodiment, the command data package may be encrypted before transmission. In one embodiment, obtaining a digital signature in response to the computing device requesting access to the trusted platform module is performed by a software application running on the operating system of the computing device, which is by an operating-system level (OS-level) application. In another embodiment, the method further includes an operation of accessing a platform firmware control domain of the trusted platform module using the platform authorization key.

According to a second aspect, there is provided a method of authenticating a command for configuring a trusted platform module in a computing device. The method includes a software application installed on the operating system of the computing device performing operations of generating a request for configuring the trusted platform module, obtaining a digital signature, where the digital signature is generated using the command, and causing the digital signature to be verified thereby authenticating the command for execution by the trusted platform module upon successful verification.

In one embodiment, the method includes retrieving a module identifier of the trust platform module stored in a memory of the computing device. The digital signature is generated further using the module identifier. In another embodiment, obtaining a digital signature includes transmitting the command to a sign server to generate the digital signature. In another embodiment, the OS-level application transmits the command to a sign server to generate the digital signature. In another embodiment, the method includes causing the digital signature to be verified by the computing device under the system management mode.

According to a third aspect, there is provided a computing device that includes a trusted platform module, a processor, a memory component configured to store a platform authorization key for permitting access to the trusted platform module, and a data storage device. The data storage device stores non-transitory instructions operative by the processor to anyone of the methods described above.

According to a further aspect, there is provided a non-transitory computer-readable medium for accessing a platform firmware control domain of a computer system. The non-transitory computer-readable medium has stored thereon program instructions for causing at least one processor to perform anyone of the methods above.

Figure 2:
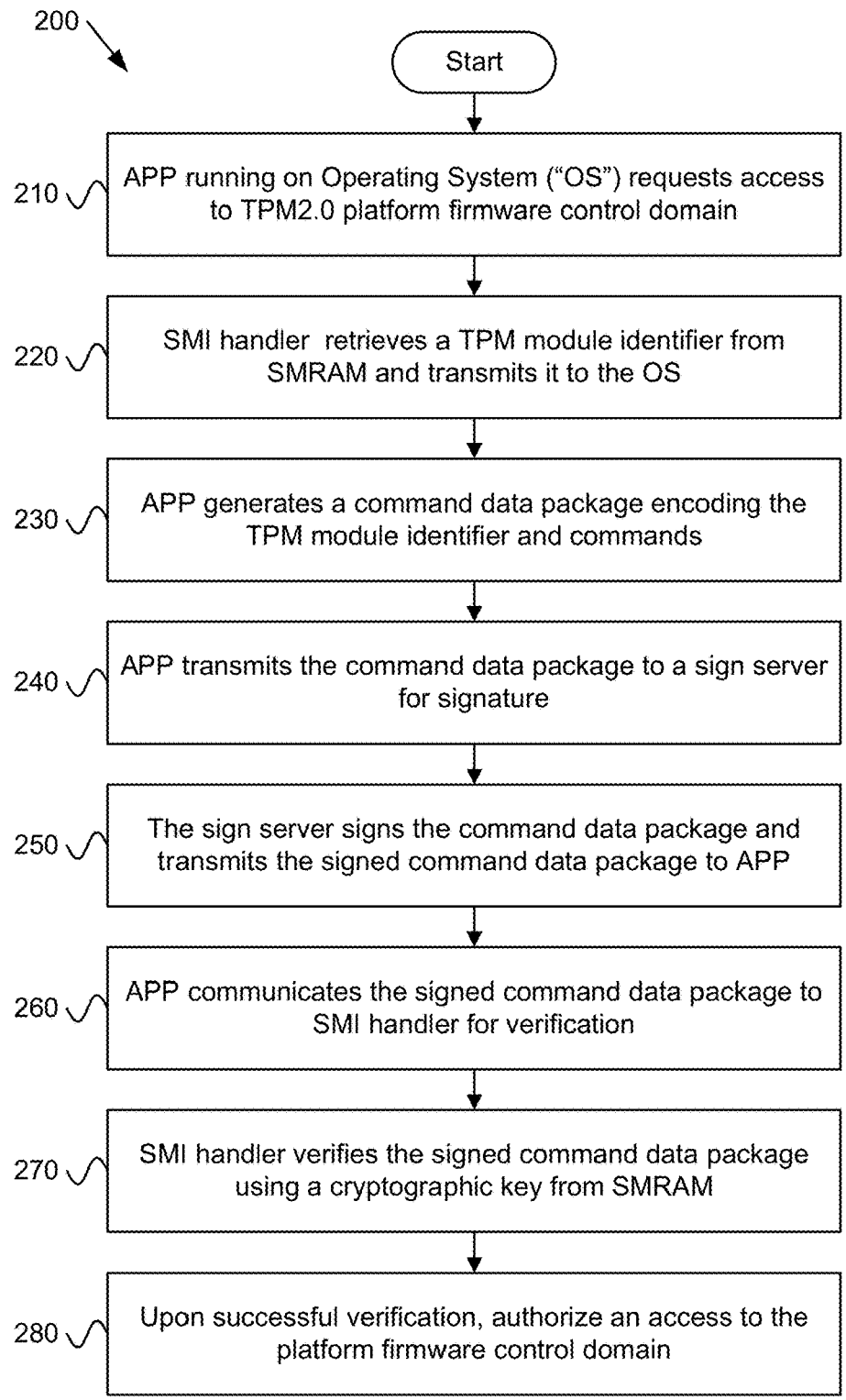
FIG. 2 is a flow diagram of a method according a further embodiment.

FIGS. 1 and 2 show exemplary methods 100, 200 for accessing a trusted platform module in a computing device. The methods 100, 200 are implemented by a computing device having a processor executing computer-readable instructions stored on a data storage device operatively coupled to the processor to process a set of inputs to create output. Such a computing device is not limited to any conventional computer such as a personal computer, a desktop computer or a tablet. It may also encompass any apparatus which has a computer processor and hardware coupled to it and whose implementation involves a firmware platform as well as an operating system, such as a server.

Figure 3:
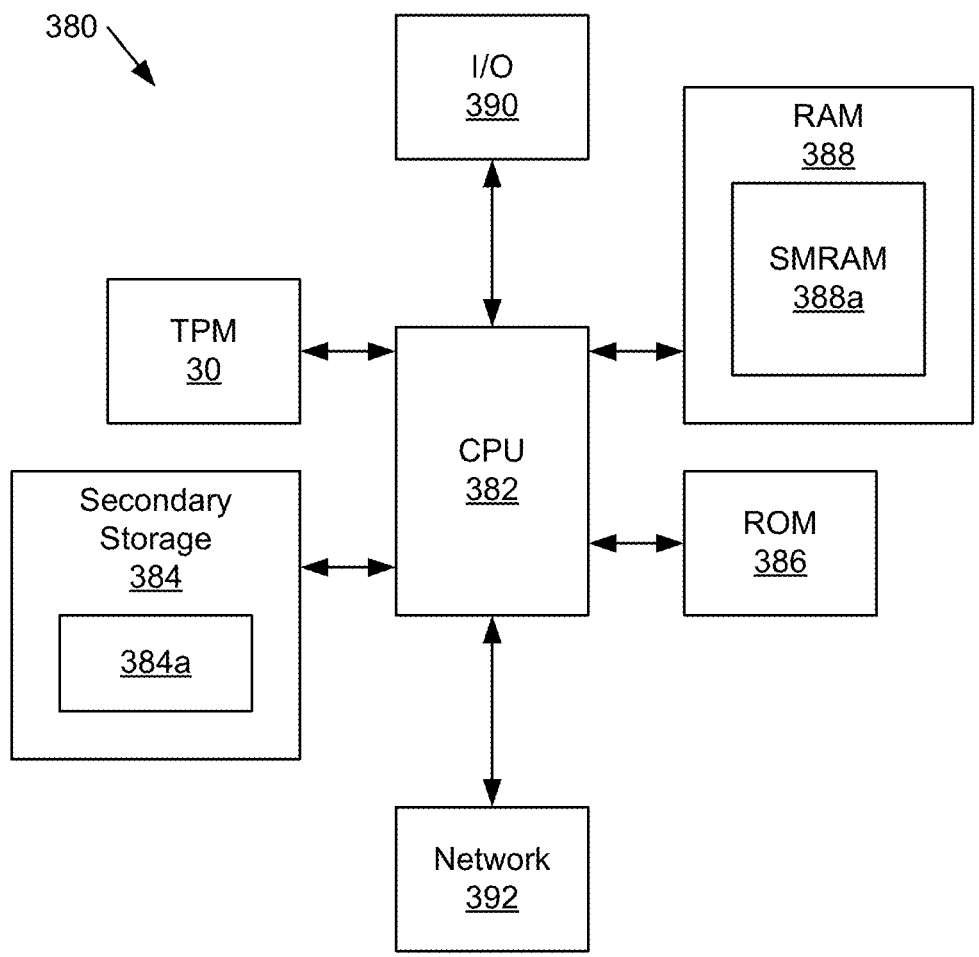
FIG. 3 is a block diagram of a computer system suitable for implementing one or more embodiments.

FIG. 3 illustrates a technical architecture 380 of an exemplary computing device which is suitable for implementing one or more embodiments disclosed herein. The technical architecture 380 includes a processor 382 (which may be referred to as a central processor unit or CPU) that is in communication with memory devices including a trusted platform module ("TPM") 30, secondary storage 384 (such as disk drives), read only memory ("ROM") 386, random access memory ("RAM") 388, input/output ("I/O") devices 390, and network connectivity devices 392. The processor 382 may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. In this embodiment, the secondary storage 384 has a component 384a comprising non-transitory instructions operative by the processor 382 to perform various operations of the method of the certain embodiments. The RAM 388 includes a system management memory component in the form of a System Management RAM ("SMRAM") 388a which is reserved for access by the processor 382 exclusively under the system management mode ("SMM"). SMRAM 388a is a portion of the system memory used by the computer processor to store code used with the SMM. The ROM 386 is used to store instructions and perhaps data which are read during program execution. The secondary storage 384, the RAM 388, and/or the ROM 386 may be referred to in some contexts as computer readable storage media and/or non-transitory computer readable media.

I/O devices 390 may include printers, video monitors, liquid crystal displays ("LCDs"), plasma displays, touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface ("FDDI") cards, wireless local area network ("WLAN") cards, radio transceiver cards that promote radio communications using protocols such as code division multiple access ("CDMA"), global system for mobile communications ("GSM"), long-term evolution ("LTE"), worldwide interoperability for microwave access ("WiMAX"), near field communications ("NFC"), radio frequency identity ("RFID"), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method operations. Such information, which is often represented as a sequence of instructions to be executed using processor 382, may be received from and outputted to the network, for example, in the form of a computer data signal embodied in a carrier wave.

A wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors.

Although the technical architecture 380 is described with reference to one computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 380 to provide the functionality of a number of servers that is not directly bound to the number of computers in the technical architecture 380. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third-party provider.

It is understood that by programming and/or loading executable instructions onto the technical architecture 380, at least one of the CPU 382, the RAM 388, and the ROM 386 are changed, transforming the technical architecture 380 in part into a specific purpose machine or apparatus having the novel functionality taught by the present disclosure. For example, a CPU 382 may function as a system management mode controller (such as an SMI handler) when executing the corresponding SMM codes stored by the SMRAM 388a. It is fundamental to the electrical engineering and software engineering arts that functionality that can be implemented by loading executable software into a computer can be converted to a hardware implementation by well-known design rules.

It should be noted that various operations of the methods 100, 200 will be described below with reference to FIGS. 1, 2 and 4. For the purpose of explanation, the operations are enumerated. It should be noted that enumeration of operations is for purposes of clarity and that the operations need not be performed in the order implied by the enumeration, as will be understood by a skilled person.

Figure 4:
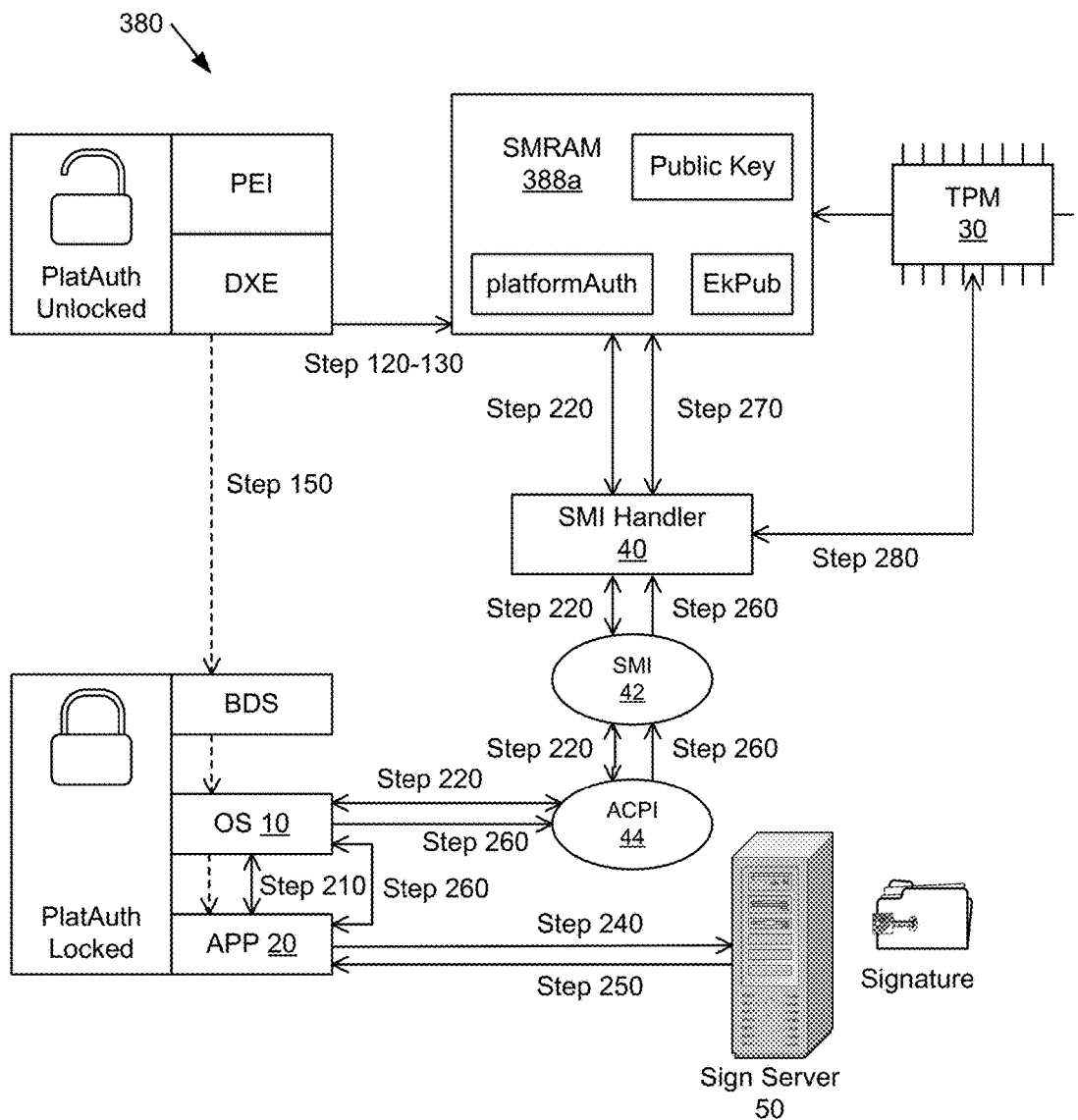
FIG. 4 is a block flow diagram illustrating the embodiments of FIGS. 1 and 2.

FIGS. 1 and 4 illustrate a method 100 performed during a boot-up of the computing device. This method may be performed by, for example, the CPU 382 executing specific computer program instructions. At step 110, a system BIOS (Basic Input/Output System) or Unified Extensible Firmware Interface ("UEFI") BIOS boot to the Driver Execution Environment ("DXE") phase, during which a platform firmware control domain of a TPM 30 is configurable by the system firmware. At this step, the platform authorization value platformAuth is empty. Note that the firmware may be BIOS, UEFI, etc., but for the simplicity of illustration, the embodiments make reference to UEFI firmware only. PEI in FIG. 4 is Pre-EFI initialization.

At step 120, the system UEFI sets the platformAuth to a random number, such as a random hashed password. This activates the access restriction to the platform firmware control domain. In other words, access will only be permitted upon authentication using the correct platformAuth.

At step 130, the computer system enters the SMM mode, and the platformAuth can be stored by the SMRAM 388a so that the authorization value is only accessible by the system UEFI. Note that in this embodiment the SMRAM also pre-stores a cryptographic key (e.g. the public key as shown in FIG. 4) generated by a sign server 50 (which will be described in more detail later), for example, which was performed as a part of the factory settings.

At step 140, a module identifier of the TPM 30 is obtained and stored by the SMRAM 388a. Generally, a module identifier of a TPM allows the TPM to be identified uniquely within a context. In this example, the module identifier is the EkPub (i.e. the Endorsement Key-Public), which is unique to each TPM. Alternatively, the module identifier could be in any other form, such as a serial number of the TPM 30.

At step 150, the computer system continues to boot to load an operating system ("OS") 10. Before performing this step, the value of platformAuth is cleared in normal memory such that platformAuth is only accessible by the system UEFI under the system management mode ("SMM").

The provision of storage of the platformAuth in the SMRAM enables the system UEFI to access this value later in response to a legitimate request from an OS-level application. This may allow a trusted TPM command generated via the OS level application to be executed by the TPM upon authentication, as will be described below. As a result, this makes it possible for the computer to configure the TPM after UEFI POST, and without requiring restarting or rebooting the computer system.

Referring to FIGS. 2 and 4, an exemplary method 200 for authenticating a command for configuring the TPM 30 using an application 20 running on an operating system (OS) 10 is illustrated.

At step 210, the application 20 (e.g. "APP" in FIGS. 2 and 4) is executed to requests access to configure the TPM 30. For example, the application 20 requests access to the firmware control domain of the TPM 30.

At step 220, the OS 10 of the computer system is configured to interact with the system UEFI via the Advanced Configuration and Power Interface ("ACPI") 44 and System Management Interrupt ("SMI") 42. Upon receiving the request from OS 10 for configuring the TPM, a SMI handler 40 retrieves the EkPub from the SMRAM 388a and the EkPub is sent back to the OS 10 and the application 20 via the ACPI 44 and SMI 42.

At step 230, the application 20 generates a command data package using the EkPub. The command data package further includes at least one command for configuring the TPM 30. For example, the application 20 may generate the command data package simply by assembling the EkPub and the command.

At step 240, the command data package is transmitted to a sign server 50. To enhance data security, the command data package is usually encrypted before transmission to the sign server 50.

At step 250, the sign server 50 is configured to sign the transmitted data package to using a private key to generate a digital signature. The private key of the sign server 50 is associated with the public key pre-stored by the SMRAM. That is, they are an asymmetric key pair (i.e. the public key and private key) of a cryptosystem, such as the RSA cryptosystem. After signing, the digital signature together with the command data package is transmitted back to the application 20 from the sign server 50. Similarly, encryption may be carried out before the transmission, and the application 20 is configured to decrypt the received data to extract the signed command data package. In a specific example, the application 20 is configured to review the received data against the command data package transmitted to the sign server 50. For example, the application 20 checks whether the received TPM command and the EkPub is consistent with the command package previously transmitted to the sign server 50, before proceeding to subsequent steps.

At step 260, the application 20 sends the signed command data package to the SMI handler 40 to cause the digital signature to be verified using the cryptographic key. For example, this is achieved through the interaction between the OS 10 and the system UEFI via the ACPI 44 and SMI 42.

At step 270, the SMI handler 40 is configured to verify the signed command data package. In particular, the SMI handler 40 extracts the EkPub and compares this value with the EKPub value stored by the SMRAM to verify that the command is associated with the TPM 30 installed on this particular computer system. In other words, if the two values do not match, it may be deduced that the encoded TPM command is not a legitimate or trusted command for configuring the TPM 30.

The SMI handler 40 further verifies the digital signature received from the application 20. Typically, the SMI handler 40 signs on the command data package (which comprises the EkPub and the TPM command) using the cryptographic key to obtain a verification electronic signature. The verification electronic signature is compared with the electronic signature. That is, the two signatures should be consistent with each other if the TPM command is a trusted TPM command.

In some embodiments, the EkPub is verified in addition to the electronic signature. It is also possible, however, to verify only the signature generated by the sign server 50 as the signature itself already encodes the EkPub information. Thus, the verification signature generated by SMI handler 40 would not be consistent with the signature generated by the sign server 50, if the EkPub has been tampered with.

At step 280, upon successful verification, an access to the platform firmware control domain is authorized for executing the TPM command. In particular, the retrieval of the platformAuth from the SMRAM 388a is granted. Therefore, an access to a platform firmware control domain of the trusted platform module is achieved using the platformAuth. On the other hand, if the verification is unsuccessful, the retrieval will be denied.

The above embodiments provide controlled access to the TPM control domain by storing a platform authorization value a memory component which is only accessible to the computer system running the system management mode, and using a digital signature to verify authenticity of the TPM commands that originated from an OS-level application before allowing access to the secure memory to retrieve the platform authorization key.

In other words, the present embodiment makes it possible for the TPM 30 to execute privileged commands originated from the OS-level application 20. Embodiments of the present method may therefore allow batch processing and execution of TPM commands for multiple computer systems. Furthermore, rebooting of the entire computer system is not required to configure the TPM 30 thereby reducing operation and time costs, especially for server computers.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code.

The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory ("CD-ROM") disks, floppy disks, jump drives, digital cards, multimedia cards, and others. The computer program product may be suitable for loading, by the technical architecture 380, at least portions of the contents of the computer program product to the secondary storage 384, to the ROM 386, to the RAM 388 (including the SMRAM 388a), and/or to other non-volatile memory and volatile memory of the technical architecture 380.

The processor 382 may process the executable instructions and/or data structures in part by directly accessing the computer program product, for example by reading from a CD-ROM disk inserted into a disk drive peripheral of the technical architecture 380. Alternatively, the processor 382 may process the executable instructions and/or data structures by remotely accessing the computer program product, for example by downloading the executable instructions and/or data structures from a remote server through the network connectivity devices 392.

Whilst the foregoing description has described exemplary embodiments, it will be understood by those skilled in the art that many variations of the embodiment can be made within the scope and spirit of the present invention. For example, other cryptosystems may be used for securing data transmission. It will also be understood that the method may be applicable for other TPM devices (including future TPM devices employing different standards) and is not limited to be used with the TPM 2.0 devices.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    storing, during a boot-up phase of a computing device, a platform authorization value that permits access to a platform control domain of a trusted platform module in a memory of the computing device, the computing device comprising the trusted platform module, the memory that is external to the trusted platform module, and system firmware interface code, wherein the trusted platform module comprises a platform hierarchy, a storage hierarchy, and an endorsement hierarchy;
    locking use of the platform authorization value so that the trusted platform module is accessible only through the system firmware interface code of the computing device;
    continuing boot-up of the computing device and loading an operating system;
    obtaining a digital signature in response to the computing device requesting access to the platform firmware control domain of the trusted platform module after the operating system is loaded, the digital signature generated using at least a command for configuring the trusted platform module;
    verifying the digital signature using the system firmware interface code; and
    allowing retrieval of the platform authorization value from the memory of the computing device in order to access the trusted platform module in response to the digital signature being verified, and denying retrieval of the platform authorization value otherwise.

2. The method of claim 1, wherein storing a platform authorization value in a memory of the computing device comprises storing the platform authorization value in a secure memory of the computing device.

3. The method of claim 2, wherein the secure memory comprises a system management memory component accessible by a processor of the computing device running under a system management mode.

4. The method of claim 3, wherein obtaining a digital signature in response to the computing device requesting access to the trusted platform module comprises:
    generating a command data package encoding a module identifier of the trusted platform module and the command; and
    transmitting the command data package to a sign server to obtain the digital signature.

5. The method of claim 4, wherein storing a platform authorization value in a memory of the computing device further comprises storing the module identifier in the memory and generating a command data package encoding a module identifier of the trusted platform module and the command comprises retrieving the module identifier from the memory.

6. The method of claim 5, further comprising verifying the module identifier and allowing retrieval of the platform authorization value further in response to successful verification of the module identifier.

7. The method of claim 4, further comprising verifying the module identifier and allowing retrieval of the platform authorization value further in response to successful verification of the module identifier.

8. The method of claim 2, wherein obtaining a digital signature in response to the computing device requesting access to the trusted platform module comprises:
generating a command data package encoding a module identifier of the trusted platform module and the command; and
transmitting the command data package to a sign server to obtain the digital signature.

9. The method of claim 1, wherein obtaining a digital signature in response to the computing device requesting access to the trusted platform module comprises:
generating a command data package encoding a module identifier of the trusted platform module and the command; and
transmitting the command data package to a sign server to obtain the digital signature.

10. The method of claim 1, wherein the memory stores a cryptographic key and verifying the digital signature comprises verifying the digital signature by signing the command data package using the cryptographic key.

11. The method of claim 1, wherein the command data package is encrypted before transmission.

12. The method of claim 1, wherein obtaining a digital signature in response to the computing device requesting access to the trusted platform module is performed by a software application running on the operating system of the computing device.

13. The method of claim 1, further comprising accessing a platform firmware control domain of the trusted platform module using the platform authorization value.

14. A program product for authenticating a command for configuring a trusted platform module in a computing device comprising the trusted platform module having a platform hierarchy, a storage hierarchy and an endorsement hierarchy, a memory component external to the trusted platform module, system firmware interface code, and a non-transitory computer readable storage medium that stores code executable by a processor of the computing device, the executable code comprising code to perform:
storing a platform authorization value in the memory component during a boot-up phase of the computing device;
locking use of the platform authorization value so that the trusted platform module is accessible only through the system firmware interface code of the computing device;
continuing boot-up of the computing device and loading an operating system of the computing device;
obtaining a digital signature in response to the computing device requesting access to the trusted platform module after the operating system is loaded, the digital signature generated using at least the command;
verifying the digital signature using the system firmware interface code; and
allowing retrieval of the platform authorization value from the memory component in order to access the trusted platform module in response to the digital signature being verified, and denying retrieval of the platform authorization value otherwise.

15. The program product of claim 14, the executable code further comprising code to perform retrieving a module identifier of the trust platform module stored in a memory of the computing device, said digital signature generated using the module identifier.

16. The program product of claim 15, wherein obtaining a digital signature comprises transmitting the command to a sign server to generate the digital signature.

17. The program product of claim 15, wherein causing the digital signature to be verified comprises causing the digital signature to be verified by the computing device under the system management mode.

18. The program product of claim 14, wherein obtaining a digital signature comprises transmitting the command to a sign server to generate the digital signature.

19. The program product of claim 14, wherein causing the digital signature to be verified comprises causing the digital signature to be verified by the computing device under the system management mode.

20. A computing device comprising:
a trusted platform module having a platform hierarchy, a storage hierarchy and an endorsement hierarchy;
a processor;
a memory component external to the trusted platform module and configured to store a platform authorization value for permitting access to the trusted platform module; and
a data storage device, the data storage device storing non-transitory instructions operative by the processor to:
store the platform authorization value in the memory component during a boot-up phase of the computing device;
lock use of the platform authorization value so that the trusted platform module is accessible only through system firmware interface code of the computing device;
continue boot-up of the computing device and loading an operating system;
obtain a digital signature in response to the computing device requesting access to the trusted platform module after the operating system is loaded, the digital signature generated using at least a command for configuring the trusted platform module;
verify the digital signature using the system firmware interface code; and
allow retrieval of the platform authorization value from the memory component in order to access the trusted platform module in response to the digital signature being verified, and to deny retrieval of the platform authorization value otherwise.

* * * * *